Figure 1:
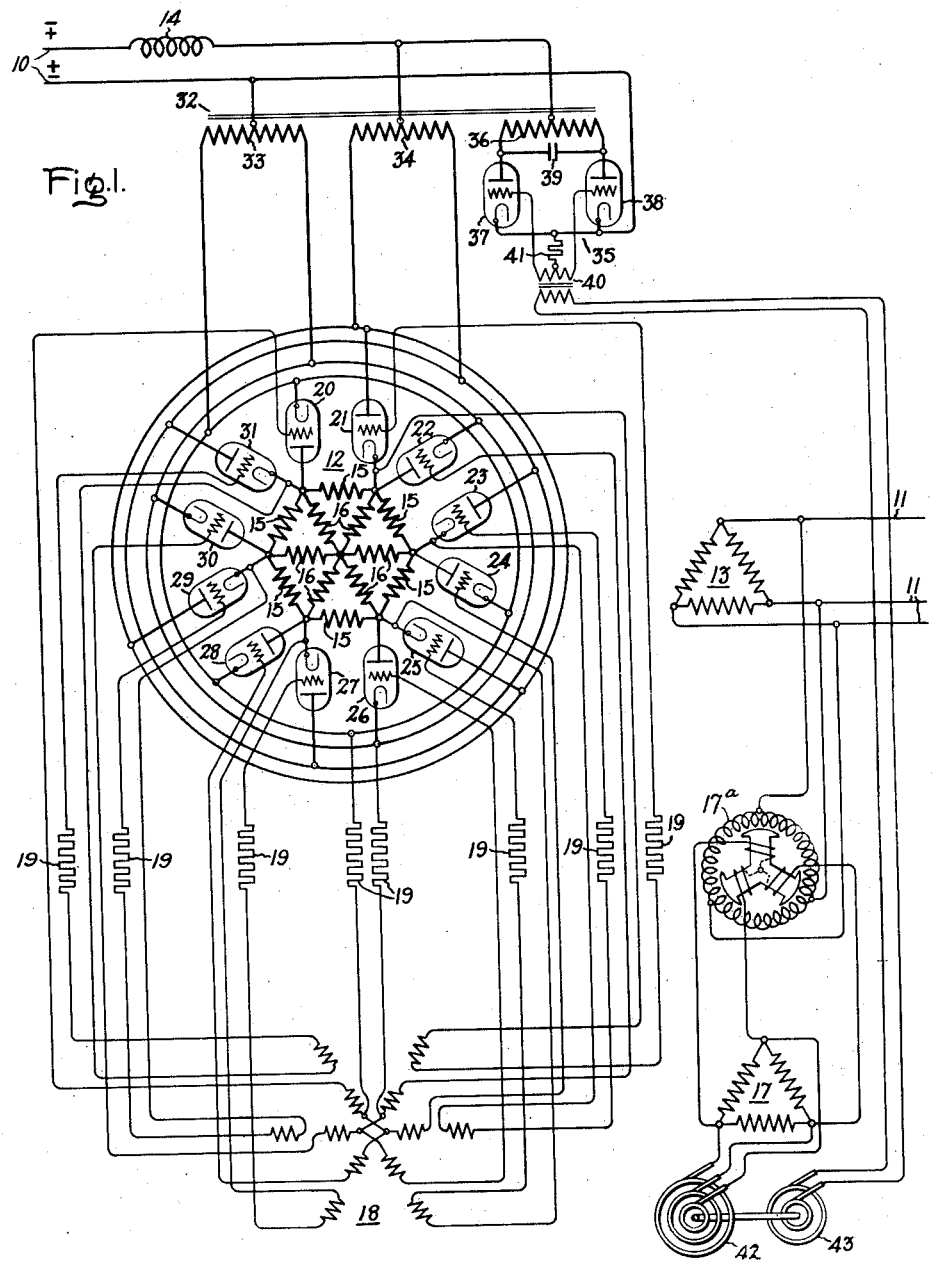

Oct. 10, 1933.  C. H. WILLIS  1,929,721
ELECTRIC VALVE CONVERTING APPARATUS
Filed Oct. 1, 1931    2 Sheets-Sheet 1

Inventor:
Clodius H. Willis,
by *Charles V. Tullar*
His Attorney.

Oct. 10, 1933.                C. H. WILLIS                1,929,721
                    ELECTRIC VALVE CONVERTING APPARATUS
                    Filed Oct. 1, 1931        2 Sheets-Sheet 2

Inventor:
Clodius H.Willis,
by Charles E. Tulla
His Attorney.

Patented Oct. 10, 1933

1,929,721

UNITED STATES PATENT OFFICE 1,929,721

ELECTRIC VALVE CONVERTING APPARATUS

Clodius H. Willis, Princeton, N. J., assignor to General Electric Company, a corporation of New York Application October 1, 1931. Serial No. 566,367

9 Claims. (Cl. 175—363)

My invention relates to electric valve converting apparatus and more particularly to such apparatus adapted to transmit energy between direct and alternating current circuits.

Heretofore, there have been devised numerous apparatus including electric valves for transmitting energy between direct and alternating current circuits or alternating current circuits of different frequencies. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been possible ordinarily to supply lagging loads on the alternating current circuit without the provision of an inordinate amount of commutating capacitance. This is due to the fact that a lagging power factor on the alternating current circuit corresponds to a transfer of load between the several electric valves at points in the cycle of alternating potential when the counter electromotive force of the inductive winding connected between the valves opposes such commutation. The same principles apply when transmitting energy from an alternating current circuit of one frequency to an alternating current circuit of another frequency or the same frequency. In many cases, however, it is desirable to supply a lagging power factor alternating current load by means of an electric valve converting apparatus.

Certain arrangements for transmitting energy between direct and alternating current circuits under any desired power factor conditions on the alternating current circuit are disclosed and claimed in my copending applications, Serial No. 566,372, Serial No. 566,368 and Serial No. 566,373, and in a copending application of C. A. Sabbah, Serial No. 566,377, all filed October 1, 1931, and all assigned to the same assignee as the present application. My invention comprises certain modifications and improvements of the arrangements described in the above-mentioned applications.

It is an object of my invention, therefore, to provide an improved electric valve converting apparatus for transmitting energy between direct and alternating current circuits under any desired power factor conditions on the alternating current circuit.

It is another object of my invention to provide an improved electric valve converting apparatus for transmitting energy from a direct current supply circuit to an alternating current load circuit under lagging power factor conditions on the alternating current circuit.

It is a further object of my invention to provide an improved electric valve converting apparatus for transmitting energy from an alternating current supply circuit to a direct current load circuit which is capable of drawing a leading power factor current from the alternating current circuit.

In accordance with my invention, direct and alternating current circuits are interconnected through an inductive winding, or a network of inductive windings, and a plurality of electric valves. The several electric valves are successively rendered alternatively conductive and nonconductive and the current is transferred between successive valves under non-unity power factor conditions on the alternating current circuits at points in the cycle when the fundamental alternating potential of the inductive winding or windings connected between the successive valves opposes commutation, by introducing into the system an alternating potential which is a harmonic of that of the alternating current circuit. By this means, the wave form of the potential in the system is distorted so that the desired commutation may be effected at points in the cycle at which such commutation would not ordinarily be possible. In accordance with my present invention, this commutating alternating potential is introduced into the system by means of a commutating inductive winding or transformer interposed in the connections between the electric valves and the direct current circuit. The harmonic commutating potential may be produced in the commutating winding by any suitable source of alternating potential, although the use of series or parallel connected parallel inverters or a commutating capacitor and reactor have been found particularly suitable.

Figure 2:
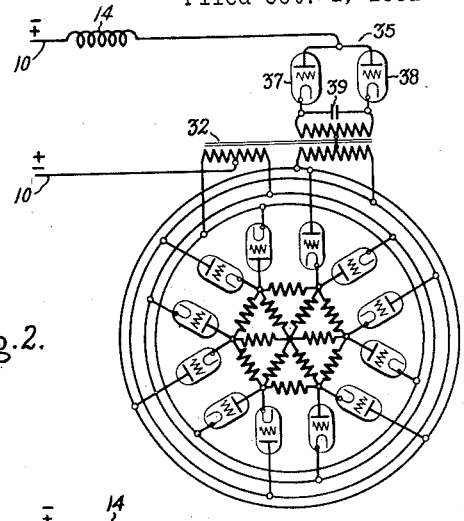
Figure 3:
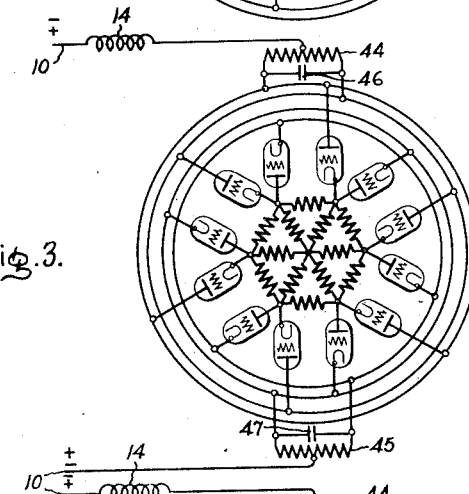
Figure 4:
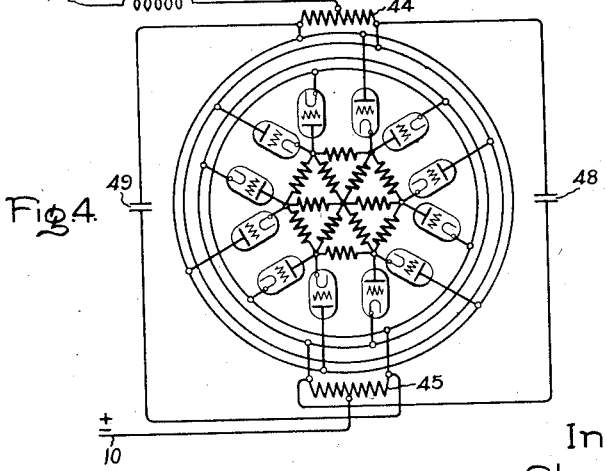

For a better understanding of my invention, together with other and further objects thereof, reference is had to the following description taken in connection with the accompanying drawings, and its scope will be pointed out in the appended claims. Referring now to the drawings, Fig. 1 is a diagrammatic representation of my invention as applied to a six-phase electric valve converting apparatus, in which the harmonic commutating potential is supplied through a commutating transformer from a parallel inverter connected across the direct current circuit; Fig. 2 shows a modification of my invention in which the harmonic commutating potential is supplied by a parallel inverter connected in series with the main electric valve converting apparatus; and Figs. 3 and 4 represent other modifications in which the harmonic commutating potential is supplied by commutating reactors and capacitors.

Referring now to Fig. 1 of the drawings, I have illustrated an arrangement for transmitting energy between a direct current circuit 10 and three-phase alternating current circuit 11. This apparatus comprises a transformer network 12 connected across the direct current circuit 10 through electric valves 20—31 inc., and an inductively coupled transformer network 13 connected to the polyphase circuit 11. If desired, a smoothing reactor 14 may be connected in the direct current circuit. Electric valves 20–31 inc., are each provided with an anode, a cathode and a control grid and may be of any of the several types well known in the art, although I prefer to use valves of the vapor electric discharge type. The transformer network 12 comprises the six-phase ring or mesh connected windings 15 and the six-phase star connected windings 16 interconnected with the ring connected windings 15 as illustrated to form a geometrically rigid network. In case the alternating current circuit 11 is connected to an independent source of electromotive force for determining its frequency and wave form, the grids of the electric valves 20—31 inc., may be excited therefrom through any suitable connection. My way of example, I have illustrated a grid transformer comprising a primary winding 17 connected to the alternating current circuit 11 and six-phase star connected secondary windings 18, comprising separate insulated phase windings for exciting the several valves or groups of valves having independent cathode potentials. The grid transformer including the windings 17 and 18 should be self-saturating or separate saturating transformers should be interposed between this transformer and the grids of the several electric valves, or some other means of producing a grid excitation of peaked wave form should be provided since each of the valves should be excited for a period somewhat less than 60 electrical degrees. However, this feature of exciting the grids with a potential of peaked wave form forms no part of my present invention but is disclosed and broadly claimed in the copending application of B. D. Bedford, Serial Number 485,335, filed September 29, 1930, and assigned to the same assignee as the present application. In order to commutate the current between the several valves under any desired power factor conditions on the alternating current circuit 11, I have provided a commutating transformer 32, having windings 33 and 34, each provided with an electrical midpoint connected to one side of the direct current circuit 10. The end terminals of the winding 33 are connected to the cathodes of alternate electric valves whose anodes are connected to the transformer network 12, while the end terminals of the winding 34 are connected to the anodes of alternate valves whose cathodes are connected to the network 12. The harmonic commutating potential may be supplied to the transformer 32 from any suitable source such as a synchronous generator, although I have illustrated by way of example, an electric valve converting apparatus of the type known in the art as the parallel inverter. This inverter comprises an inductive winding 36 having an electrical midpoint connected to one side of the direct current circuit and two end terminals connected to the other side of the direct current circuit through electric valves 37 and 38. A commutating condenser 39 is connected across the terminals of the winding 36 which constitutes the exciting winding of the transformer 32. Electric valves 37 and 38 are preferably of the vapor electric discharge type, each provided with an anode, a cathode and a control grid. The grids of electric valves 37 and 38 are connected to their common cathode circuit through opposite halves of the secondary winding of a grid transformer 40 and a current limiting resistor 41. The primary winding of grid transformer 40 may be energized from any suitable source of alternating potential which is a harmonic of that of the alternating current circuit 11, as for example, from a frequency changer comprising a synchronous motor 42 energized from the alternating current circuit 11 and a synchronous generator 43 directly connected thereto. In case it is desired to change the power factor conditions on the alternating current circuit during the operation of the apparatus, a suitable phase shifting arrangement, such for example, as a rotary phase shifting transformer 17a, is interposed in the connections between the alternating current circuit 11 and the grid transformer 17 and the frequency changer comprising the motor 42 and generator 43. While I have illustrated as a source of harmonic commutating potential a parallel inverter 35 of the type disclosed and claimed in United States Letters Patent No. 1,800,002, granted April 7, 1931, upon the application of E. F. W. Alexanderson, it will be apparent to those skilled in the art that any other type of electric valve converting apparatus may be substituted therefor, such, for example, as the series inverter disclosed and claimed in United States Letters Patent No. 1,752,247, granted March 25, 1930, upon the application of A. S. FitzGerald. Neglecting the harmonic excitation of the system, the general principles of operation of the above described valve converting apparatus will be well understood by those skilled in the art. When the system is operating as a rectifier, current will flow from the network 12 through one of the valves, for example valve 26, to the lower direct current terminal 10, which will be positive under these conditions, through the direct current load circuit, completing the circuit through electric valve 31. This current will be successively transferred between adjacent similarly connected valves at the frequency of the alternating current supply circuit, each of the several electric valves being conductive for one sixth of a cycle. As will be well understood by those skilled in the art, the average voltage of the direct current circuit 10 may be controlled by adjusting the phase relation between the grid and anode potentials of the several electric valves, the voltage of the direct current circuit 10 decreasing as the grid potentials are retarded with respect to the anode potentials. As stated above, with this type of voltage control, the rectifying apparatus becomes the equivalent of a lagging load on the alternating current circuit, while in most cases it is preferable to draw a leading current from the alternating current circuit in order to improve the power factor of the system. However, by producing in the commutating windings 33 and 34 an alternating potential which is a harmonic of that of the alternating current circuit 11, preferably the third harmonic for the six-phase arrangement illustrated, every sixty electrical degrees, when the current is commutated between successive valves, the maximum potential of the commutating winding interconnecting these valves is effective to transfer the current between them against the electromotive force of the inductive network 12, so that current may be commutated between the several valves at earlier points in the cycle of alternating potential, corresponding to leading power factor conditions on the circuit 11. This operation is explained in more detail in my copending application Ser. No. 566,372 above referred to. By exciting the grid transformer 40 with a third harmonic of alternating potential, the parallel inverter 35 has been found to be a very suitable source of harmonic commutating potential. The manner in which the inverter 35 operates to generate this alternating potential will be well understood by those skilled in the art, or it will be found explained in detail in the above mentioned Alexanderson patent.

On the other hand, if the system is operating as an inverter, transmitting energy from the direct current circuit 10 to the alternating current circuit 11, current will flow from the upper or positive direct current terminal 10 into one of the electric valves, for example valve 31, through the transformer network 12 and electric valve 26 to the other side of the direct current circuit. Sixty electrical degrees after valves 31 and 26 have started to conduct current, electric valves 21 and 28 will be made conductive and the current will be transferred to them. In this way the current will be successively commutated between the several electric valves, each pair of valves being conductive for sixty electrical degrees. As stated above, it is not ordinarily possible to commutate the current between the several valves under conditions corresponding to a leading power factor on the alternating current circuit. As in the case of the rectifier, however, the commutating windings 33 and 34, energized with a third harmonic of alternating potential, provide electromotive forces opposing those appearing in the network 12 between the adjacent valves, which tends to prevent commutation, thus enabling the current to be commutated between the several electric valves at a later point in the cycle of alternating current; that is, enabling the apparatus to supply a lagging load to the alternating current circuit 11. When it is desired to change the power factor conditions on the alternating current circuit with the apparatus operating either as a rectifier or an inverter, it is preferable to vary the phase relation of the harmonic commutating potential in accordance with variations in the phase of the load current, that is in accordance with variations in the phase of the grid potentials of the electric valves. In the arrangement described above this is accomplished by interposing a rotary phase shifting transformer 17a between the alternating current circuit 11 and the source of excitation of the main electric valves and of the electric valves 37 and 38 of the harmonic potential inverter. In this way, any variations in the phase of the grid potentials of the main electric valves, by means of which the power factor conditions on the alternating current circuit are controlled, effects a similar phase variation of the grid potentials of the valves 37 and 38 by an angle equal to the variation of the grid potential of the main electric valve referred to the fundamental frequency. By properly adjusting the relative amplitudes of the third harmonic and the fundamental electromotive forces and by adjusting the phase relation therebetween, it has been found possible to transmit energy between the direct and alternating current circuits in either direction at any desired power factor from unity to substantially zero leading or lagging.

Fig. 2 illustrates a modification of the arrangement shown in Fig. 1 in which the parallel inverter 35 is connected in series with the main valve converting apparatus rather than in parallel as in the arrangement of Fig. 1. This arrangement may be desirable in certain instances as it decreases the possibility of a short circuit of the direct current circuit due to a failure of the valves by including three valves in any series circuit across the direct current circuit. If the ratio of transformation of the transformer 32 is unity, the manner of operation is substantially identical with that described in connection with Fig. 1. However, if the ratio of turns of the exciting winding to the commutating windings is less than unity, a portion of the load current must flow through capacitor 39, which is equivalent to putting a fractional part of the capacitor in series relationship with the load current of the apparatus. In such a case the operation is modified along the lines of that described below in connection with Fig. 3.

In Fig. 3 there is illustrated a modification of my invention in which the commutating transformer comprising windings 33 and 34 is replaced by independent commutating reactors 44 and 45 and their associated commutating capacitors 46 and 47, respectively. In this arrangement, it is seen that the capacitors 46 and 47 are effectively in series with the main valve converting apparatus since, neglecting the exciting admittance of the windings 44 and 45, any load current which flows through one half of these reactors must be balanced by an equal and opposite current flowing in the other half and the only path in which these balancing currents can flow is through the capacitors 46 and 47. The result is that, during the interval in which one pair of the main electric valves is conducting, the capacitors 46 and 47 become charged with one polarity to a potential proportional to the amount of load current flowing. During the next successive interval when the next successive pair of electric valves is conducting, these capacitors become charged to an equal potential of opposite polarity. Since the load current is transferred between the two halves of the commutating windings 44 and 45 for each transfer of current between the adjacent valves it is seen that the potential of the capacitors 46 and 47 will reverse polarity six times for each complete cycle. In other words, the potential of the capacitors 46 and 47 will be a third harmonic of the fundamental as in the arrangements of Figs. 1 and 2. The use of commutating reactors and capacitors as just described, has the advantage that the commutating potential increases with the load on the apparatus. In this arrangement the phase of the harmonic commutating potential automatically varies with the phase of the load current since it is produced by the load current.

The arrangement illustrated in Fig. 4 is similar to that of Fig. 3 with the exception that the commutating capacitors 48 and 49 are so connected that they are charged in parallel to opposite polarity, but discharge in series through the four electric valves to be commutated.

While I have illustrated my invention as applied to a six-phase electric valve converting apparatus, it will be well understood by those skilled in the art that it is equally applicable to any polyphase system of a greater number of phases than three, in each case the frequency of the harmonic commutating potential being preferably equal to $\frac{n}{2}$ times that of the alternating current circuit, where $n$ represents the number of phases of the network 12. It will also be obvious to those skilled in the art that my invention is equally applicable to a half wave electric valve converting apparatus, in which case one of the commutating windings is omitted and the corresponding direct current terminal is connected to the neutral of the transformer network 12.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. A system for transmitting energy between direct and alternating current circuits comprising a polyphase network of inductive windings and a plurality of electric valves cooperating therewith for interconnecting said circuits, an inductive winding interposed in the connections between said valves and said direct current circuit, and static means for producing across said inductive winding an alternating potential which is a harmonic of that of the alternating current circuit for commutating the current between said valves under any desired power factor conditions on said alternating current circuit.

2. A system for transmitting energy between direct and alternating current circuits comprising a polyphase network of inductive windings and an electric valve connected to each terminal thereof for interconnecting said circuits, an inductive winding interconnecting adjacent electric valves and provided with an intermediate terminal for connection to said direct current circuit, and means including electric valves and a capacitor for producing across said inductive winding an alternating potential which is a harmonic of that of the alternating current circuit for commutating the current between said valves under any desired power factor conditions on said alternating current circuit.

3. A system for transmitting energy between direct and alternating current circuits comprising a polyphase network of inductive windings and a plurality of electric valves cooperating therewith for interconnecting said circuits, commutating means including a capacitor, and means independent of said network for producing across said capacitor a potential which is a harmonic of that of said alternating current circuit for commutating the current between said valves under any desired power factor conditions on said alternating current circuit.

4. A system for transmitting energy between direct and alternating current circuits comprising a polyphase network of inductive windings and a plurality of electric valves cooperating therewith for interconnecting said circuits, an inductive winding interposed in the connections between said valves and said direct current circuit, an auxiliary electric valve inverter coupled to said inductive winding, and means for driving said inverter at a frequency which is a harmonic of that of said alternating current circuit for commutating the current between said valves under any desired power factor conditions on said alternating current circuit.

5. In combination, a direct current circuit, an alternating current circuit, and means for transmitting energy therebetween under any desired power factor conditions on said alternating current circuit comprising a polyphase network of inductive windings and a plurality of electric valves cooperating therewith for interconnecting said circuits, a commutatng transformer interposed in the connections between said valves and said direct current circuit, an auxiliary electric valve inverter connected across said direct current circuit and having an output circuit connected to excite said commutating transformer, and means for exciting the valves of said auxiliary inverter at a frequency which is a harmonic of that of said alternating current circuit.

6. In combination, a direct current circuit, an alternating current circuit, and means for transmitting energy therebetween under any desired power factor conditions on said alternating current circuit comprising a polyphase network of inductive windings and a plurality of electric valves cooperating therewith for interconnecting said circuits, a commutating transformer and an auxiliary electric valve inverter serially included in the connections between said valves and said direct current circuit, the output of said inverter being connected to excite said transformer, and means for exciting said auxiliary inverter at a frequency which is a harmonic of that of said alternating current circuit.

7. In combination, a direct current circuit, an alternating current circuit, and apparatus for transmitting energy therebetween under any desired power factor conditions on said alternating current circuit comprising a polyphase network of inductive windings and an electric valve connected to each terminal of said network, and a commutating capacitor in series relationship with the load current of the apparatus, each terminal of said capacitor being connected to the electric valves associated with alternate terminals of said network.

8. In combination, a direct current circuit, an alternating current circuit, and means for transmitting energy therebetween under any desired power factor conditions on said alternating current circuit comprising a polyphase network of inductive windings and a plurality of electric valves cooperating therewith for interconnecting said circuits, a commutating reactor interposed in the connections between said valves and said direct current circuit, and a capacitor connected in parallel with said reactor.

9. In combination, a direct current circuit, an alternating current circuit, and means for transmitting energy therebetween under any desired power factor conditions on said alternating current circuit comprising a polyphase network of inductive windings and an electric valve connected to each terminal of said network, a commutating reactor provided with end terminals each connected to the electric valves associated with alternate terminals of said network and with an electrical midpoint connected to said direct current circuit, and a capacitor connected in parallel with said inductive winding.

CLODIUS H. WILLIS.